United States Patent
Bender et al.

(10) Patent No.: US 10,958,458 B2
(45) Date of Patent: Mar. 23, 2021

(54) COGNITIVE MEETING PROXY

(71) Applicant: International Business Machines Corporation, Armonk, NY (US)

(72) Inventors: Michael Bender, Rye Brook, NY (US); Michael P. Shute, Niantic, CT (US); Gordan G. Greenlee, Endicott, NY (US); Siddhartha Sood, Indirapuram (IN)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 15/943,925

(22) Filed: Apr. 3, 2018

(65) Prior Publication Data
US 2019/0305976 A1 Oct. 3, 2019

(51) Int. Cl.
*G06F 15/16* (2006.01)
*H04L 12/18* (2006.01)
*H04L 29/06* (2006.01)
*G10L 15/18* (2013.01)
*G06Q 10/10* (2012.01)

(52) U.S. Cl.
CPC ..... *H04L 12/1818* (2013.01); *G06Q 10/1095* (2013.01); *G10L 15/1807* (2013.01); *H04L 65/1093* (2013.01)

(58) Field of Classification Search
CPC ............ H04L 12/1818; H04L 65/1093; G06Q 10/1095; G10L 15/1807
See application file for complete search history.

(56) References Cited

U.S. PATENT DOCUMENTS

| 8,239,236 | B2 | 8/2012 | Mansour | |
|---|---|---|---|---|
| 9,204,098 | B1 * | 12/2015 | Cunico | G11B 27/036 |
| 9,652,113 | B1 * | 5/2017 | Colson | G10L 15/26 |
| 9,818,406 | B1 * | 11/2017 | Chan | G10L 15/22 |
| 10,147,424 | B1 * | 12/2018 | Indyk | G06F 16/313 |

(Continued)

OTHER PUBLICATIONS

Kaukka et al., "Cross-cultural decoding of positive and negative non-linguistic emotion vocalizations", Jul. 2013, frontiers in Psychology, https://www.ncbi.nlm.nih.gov/pmc/articles/PMC3728469/pdf/fpsyg-04-00353.pdf.*

(Continued)

*Primary Examiner* — Douglas B Blair
(74) *Attorney, Agent, or Firm* — Heslin Rothenberg Farley & Mesiti P.C.; Michael Petrocelli, Esq.

(57) ABSTRACT

A method, computer program product, and a system include a processor(s) that monitors an event, as a proxy for an invitee, to assign or periodically update a value (the value shifts temporally during the event). The processor(s) monitors the event by analyzing sentiment and emotion in verbal content, generate a speech baseline for each attendee, i.e., tone neutral vocal communication patterns, determine an aggregate tone for the event, and generating and progressive update, during the monitoring, the value (the value represents deviations in tone from the aggregate tone in portions of the verbal content proximate to an occurrence of one or more keywords relevant to the invitee, based on the aggregate tone and the speech baseline for each of the one or more attendees). The processor(s) determine that the value has exceeded a threshold and trigger an action to facilitate connection of the invitee to the event.

12 Claims, 6 Drawing Sheets

(56) References Cited

U.S. PATENT DOCUMENTS

| | | | | |
|---|---|---|---|---|
| 2006/0245377 | A1* | 11/2006 | Jeong | H04Q 3/0045 370/260 |
| 2009/0210228 | A1* | 8/2009 | George | H04M 3/4936 704/251 |
| 2012/0008754 | A1* | 1/2012 | Mukherjee | G10L 15/22 379/88.18 |
| 2013/0108029 | A1* | 5/2013 | Blewett | H04M 3/563 379/67.1 |
| 2013/0176413 | A1* | 7/2013 | Lowry | H04M 3/5175 348/77 |
| 2015/0350258 | A1* | 12/2015 | Griffin | H04L 65/1093 348/14.08 |
| 2016/0277577 | A1* | 9/2016 | Yentis | H04M 3/5175 |
| 2016/0284354 | A1* | 9/2016 | Chen | G10L 15/26 |
| 2016/0350724 | A1 | 12/2016 | Tang et al. | |
| 2017/0006069 | A1 | 1/2017 | Srivastava et al. | |
| 2018/0032611 | A1* | 2/2018 | Cameron | G06K 9/723 |
| 2018/0082679 | A1* | 3/2018 | McCord | G06N 3/04 |
| 2018/0145934 | A1* | 5/2018 | Pappu | H04L 12/1822 |
| 2018/0261219 | A1* | 9/2018 | Brooks | G06Q 10/06398 |
| 2018/0341703 | A1* | 11/2018 | McCarty | G06F 16/7867 |
| 2018/0375947 | A1* | 12/2018 | Hodges | G06Q 30/0201 |
| 2019/0258667 | A1* | 8/2019 | McCarty | G06F 3/16 |
| 2019/0289372 | A1* | 9/2019 | Merler | G06K 9/00744 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

IPCOM000202101D, "A Sytsem for Predictively Recording Meetings of Interest", Published Dec. 3, 2010.

IPCOM000223684D, "Broadcast Status in Messaging/Meeting When Remote Connection Drops", Published Nov. 23, 2012.

IPCOM000238576D, "Automatice Deployment of Cognitive Computing Component With Triggered Meeting Cancellations", Published Sep. 4, 2014.

Chen et al., "Multimodal behavior and Interaction as Indicators of Cognitive Load", May 2011, ACM Trans. Interact. Intell. Syst., 33 pages.

* cited by examiner

COGNITIVE MEETING PROXY

BACKGROUND

The schedule of a given individual can be complicated to maintain and often times, an individual will be expected to attend more than one meeting at the same time, which is not possible. Also, attending a meeting may interfere with the individual's ability to devote time to completing a project. When a choice is made by an individual (or for an individual), that the individual is to attend or not to attend a given meeting (or other event, as a meeting is only used as a non-limiting example), in retrospect, that choice may not have been the best choice. For example, a meeting that appeared critical from the invitation may move in a different direction during the course of the meeting, negating the need for the individual's presence. Alternatively, a meeting that appeared less important, may become critical based on questions and subjects arising during the meeting. Thus, when an individual makes a decision to attend one meeting over another, or one meeting at all, hindsight may reveal the choice to have not been the most productive.

SUMMARY

Shortcomings of the prior art are overcome and additional advantages are provided through the provision of a method for analyzing event context and content to provide for efficient resource distribution. The method includes, for instance: obtaining, by one or more processors, an instruction to connect to attend an event, via a network, from one or more resources executing an electronic hosting platform, based on determining that an invitee is unavailable at a start time of the event hosted on the electronic hosting platform; monitoring, by the one or more processors, the event, based on the instruction, to assign or periodically update a value for the event, the event including verbal content provided by one or more attendees of the event, and the value comprises a temporally shifting value during the event, wherein the attendees provide the verbal content via one or more client computing devices communicatively coupled to the electronic hosting platform during a duration of the event, the monitoring comprising: analyzing, by the one or more processors, sentiment and emotion in the verbal content; generating, by the one or more processors, based on analyzing the sentiment and the emotion in the verbal content, a speech baseline for each of the one or more attendees, wherein the speech baseline for each of the one or more attendees comprises a tone neutral vocal communication pattern for each of the one or more attendees; determining, by the one or more processors, based on analyzing sentiment and emotion in the verbal content, an aggregate tone for characterizing the event; and generating and progressively updating during the monitoring, by the one or more processors, the value, wherein the value represents deviations in tone from the aggregate tone in portions of the verbal content proximate to an occurrence of one or more keywords relevant to the invitee, based on the aggregate tone and the speech baseline for each of the one or more attendees; determining, by the one or more processors, that the value has exceeded a preconfigured threshold; and triggering, by the one or more processors, based on the value having exceeded the preconfigured threshold, an action to facilitate connection of the invitee to the event.

Shortcomings of the prior art are overcome and additional advantages are provided through the provision of a computer program product for analyzing event context and content to provide for efficient resource distribution. The computer program product comprises a storage medium readable by a processing circuit and storing instructions for execution by the processing circuit for performing a method. The method includes, for instance: obtaining, by one or more processors, an instruction to connect to attend an event, via a network, from one or more resources executing an electronic hosting platform, based on determining that an invitee is unavailable at a start time of the event hosted on the electronic hosting platform; monitoring, by the one or more processors, the event, based on the instruction, to assign or periodically update a value for the event, the event including verbal content provided by one or more attendees of the event, and the value comprises a temporally shifting value during the event, wherein the attendees provide the verbal content via one or more client computing devices communicatively coupled to the electronic hosting platform during a duration of the event, the monitoring comprising: analyzing, by the one or more processors, sentiment and emotion in the verbal content; generating, by the one or more processors, based on analyzing the sentiment and the emotion in the verbal content, a speech baseline for each of the one or more attendees, wherein the speech baseline for each of the one or more attendees comprises a tone neutral vocal communication pattern for each of the one or more attendees; determining, by the one or more processors, based on analyzing sentiment and emotion in the verbal content, an aggregate tone for characterizing the event; and generating and progressively updating during the monitoring, by the one or more processors, the value, wherein the value represents deviations in tone from the aggregate tone in portions of the verbal content proximate to an occurrence of one or more keywords relevant to the invitee, based on the aggregate tone and the speech baseline for each of the one or more attendees; determining, by the one or more processors, that the value has exceeded a preconfigured threshold; and triggering, by the one or more processors, based on the value having exceeded the preconfigured threshold, an action to facilitate connection of the invitee to the event.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
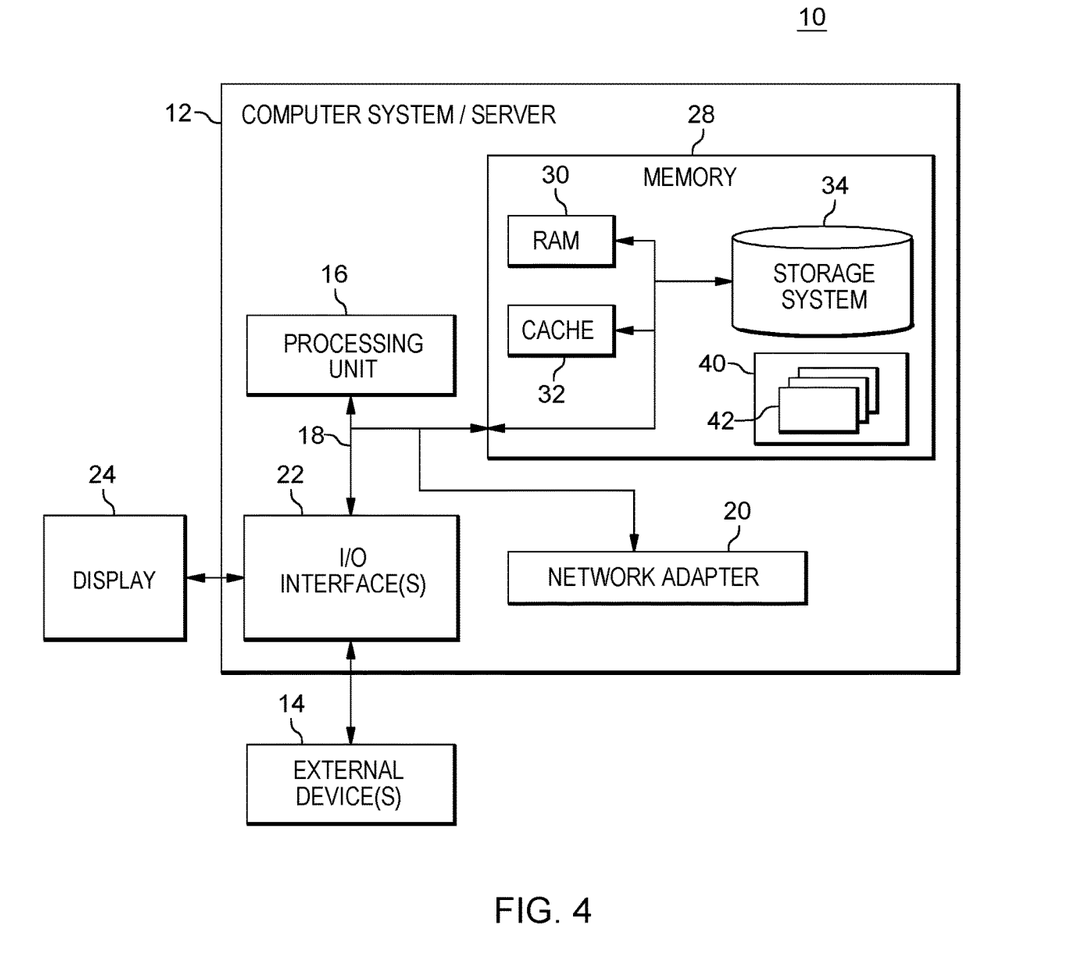
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention include a computer-implemented method, a computer program product, and a computer system for implementing a cognitive proxy which includes one or more programs that: 1) determine when a telephone or web-based event is occurring, based on interfacing with an electronic calendaring system; 2) monitor the event (e.g., a meeting), including recording the event and analyzing the content of the event; 3) determine, based on cognitively analyzing the real-time content of the event, whether the user should join the event; and 4) continuously monitor the event after joining the user to perceive the outcome of the addition of the user and to update the cognitive analysis capabilities based on the outcome (as compared to a predicted outcome).

In an embodiments of the present invention, upon determining that a user is invited to an event, the one or more programs may initiate a computerized proxy for monitoring/attending the event. The event may be an event that is either a teleconference and/or web-based. The one or more programs monitor the progression of the event to determine the tone of the event, based on conversation between attendees of the event using a cognitive analysis of voice patterns and words, and determining the tone surrounding mentions of the user. Based on the tone and its proximity to one or more mentions of the user, the one or more programs determine whether to notify the user that the user should attend the event. The one or more programs may base this cognitive analysis, in part, by a database of speech patterns, of the event attendees, which the one or more programs may generate and continually update. In some embodiments of the present invention, the one or more programs may automatically join the user to the event, upon determining that the user should be present, based on the cognitive analysis. However, in some embodiments of the present invention, the one or more programs notify the user that the user should attend the event (e.g., by dialing in and/or connecting), and provide a basis for this conclusion to the cognitive analysis to the user. The notification and basis include a rating that the one or more programs calculate to represent the perceived importance of the user's presence. The one or more programs may also provide the user with content from the events upon which the one or more programs based the results of the cognitive analysis, including but not limited to, a text readout from the event and/or sound clips from the event. In some embodiments of the present invention, the rating may represent a prediction by the one or more programs of value added to the event by the user personally attending the event.

In some embodiments of the present invention, in addition to notifying a user that the user should attend the event (or automatically joined a user to an event), the one or more programs notify the attendees of the event of the forthcoming attendance of the user. This notification may include an estimated time interval between when the one or more programs notified the user and an estimated time for when the user will join the event. The one or more programs may calculate this time interval, based on a response of the user to the notification.

Specifically, embodiments of the present invention include one or more programs executed on a processing circuit that ingest, compute and (machine) learn from the cadence and content of speech patterns of potential attendees of events, the tone of these various individuals, when expressing various sentiments. The one or more programs build a sentiment analysis database and apply the content of the database to determine the "tone" of a meeting by applying computerized voice and spoken content recognition/analysis methods to the contributions of each user involved in the meeting. Utilizing this database, one or more programs comprising a computerized proxy may attend an event (hosted on a computerized conferencing system) and determine, in real time: 1) that a given user who is not in attendance at the event is mentioned at the event; and 2) the context/tone in which the user was mentioned. Based on recognizing the user and determining the context, the one or more programs determine whether to notify the user to suggest that the user join the meeting. In other embodiments of the present invention, the one or more programs may automatically join the user to the event, via the computerized conferencing system.

Various aspects discussed herein not only distinguish embodiments of the present invention over existing solutions as being more efficient, effective, and/or comprehensive, these aspects of some embodiments of the present invention are also inextricably tied to computing. For example, in embodiments of the present invention, the one or more programs identify both general and user-specific speech patterns and sentiments associated with those patterns, to determine whether a user's presence at an event could positively impact the perceived tone, and continually improve the cognitive analysis that provides the determination, based on monitoring and analyzing the results of the determination. Put plainly, if the one or more programs determine that the tone of a meeting would become more positive with the attendance of an absent individual, after the individual joins (either based on being notified by the one or more programs or being automatically joined to the meeting by the one or more programs), the one or more programs continue to monitor the meeting to determine whether the determination was correct. To determine the tone of a meeting, the computerized agent may perform sentiment and emotion analysis around conversation occurring during the event.

The one or more programs update the cognitive analytics utilized to reflect this result. Hence, the ability of the one or more programs to monitor an event hosted on a computing platform and synthesize a variety of data enables the one or more programs to factor information into the analysis, including temporal data, which is synthesized in real-time, in order to realize the impacts of the data in a manner that informs future actions related to both the present event and future events (e.g., with a subset of the same attendees). The one or more programs provide predictive guides and other measures as the one or more programs anticipate upcoming needs for event attendance, rather than alert potential attendees to events and passively record the event for those who cannot attend, based on various scheduling conflicts.

Unlike existing electronic event scheduling conflict resolution techniques, embodiments of the present invention utilize cognitive techniques to determine if a represented attendee is required during the event and then provide feedback to the represented attendee to demonstrate to the attendee the reasoning behind the determination that the attendee should join the event. In personalizing the approach to event attendance, in some embodiments of the present invention, the one or more programs analyze unstructured data, including but not limited to, present and past statements and expressions of a individuals comprising a group participating in the event. For example, as explained below, the one or more programs in embodiments of the present invention, may determine an expressive baseline for a given user and determine degrees of deviation from the baseline. A baseline represents a condition in which a user speaks with a neutral tone. Deviations would represent a change in tone. Thus, from this data, the one or more programs generate a data model to correlate attendance of an individual with a level of need for this attendance, based on the tone of the attendees of the event, in the absence of the individual. The one or more programs reference the data model when generating a recommendation or automatically connecting the individual, to the event, which is hosted on an electronic meeting platform.

An advantage of embodiments of the present invention over present approaches to electronic event scheduling and scheduling conflict mitigation is that embodiments of the present invention perform multi-factor cognitive analytics that enable one or more programs executed by at least one processing circuit in these embodiments to both determine and anticipate participant-driven needs for the attendance of an absent invitee at a given event. Rather than, for example, broadcast an event that an individual may be missing, to that individual, until such a time that the individual determines that he or she should join, in embodiments of the present invention, one or more programs comprising a cognitive agent can remove the onus from an absent invitee by monitoring the meeting and generating, obtaining, and analyzing, the content of the meeting, including the statements by the attendees, as part of a cognitive analysis, in order to recognize and anticipate changes in tone that would suggest an advantage to adding the absent individual to the event.

Figure 1:
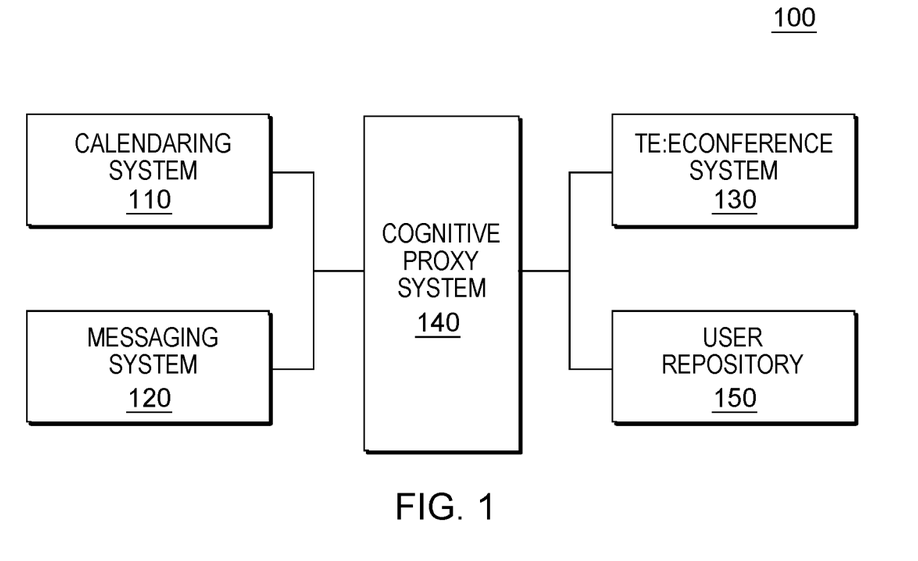
FIG. 1 is an illustration of various aspects of an environment in which aspects of embodiments of the present invention may be implemented.

Embodiments of the present invention are additionally directed to a specific improvement to the way computers operate because these embodiments present a solution that is necessarily rooted in computer technology in order to overcome a problem specifically arising in the realm of computer networks. As illustrated in FIG. 1, which will be discussed herein, technical environments into which aspects of embodiments of the present invention are implemented include a networked computer environment 100 (FIG. 1) of an online conference system (e.g., teleconferencing system 130, FIG. 1), which is recognized as a bandwidth limited computing environment, in which services and features provided to existing participants of a conference is affected by a number of users participating in the conference and users joining a conference. Embodiments of the present invention provide an intelligent filtering of participants so that users avoid joining conferences unnecessarily. By providing this intelligent filtering, the one or more programs of embodiments of the present invention reduce the number of connected participants and therefore, enhance services and features to connected conference participants, who do join a conference. The problem of multiple participants in a conference limiting the quality of a conference for those engaged is known and discussed in the specification details for Real-Time Transport Protocol (RTP), the real time transport protocol for use in supporting real time applications involving "audio, video, or simulation data, over multicast or unicast network services" and the associated control protocol Real-Time Control Protocol (RTCP). Available session bandwidth is divided among participants, and joining by new participants can disrupt performance of a network. When a participant connects to join a session, the frequency of control packet transmission is reduced, thus the joining of a session by a user reduces the providing of features and services to existing connected participants because for each session, the data traffic is subject to an aggregate limit called the "session bandwidth" to be divided among the participants. Embodiments of the present invention enable users to assess the need for their attendance at an event on a hosting platform before attending and utilizing a portion of the aggregate bandwidth.

Embodiments of the present invention provide various advantages over existing scheduling conflict mitigation systems. For example, the computerized proxy of embodiments of the present invention can attend meetings as a delegate for an individual and allow the person to be contacted, should the proxy determine that a need for attendance has arisen that is sufficient to alert the individual. When alerting the individual, the one or more programs (e.g., the computerized proxy) can convey a level of importance as the proxy utilizes words and tone to produce a ranking representing the perceived importance of the individual joining the meeting. This ranking is additionally advantageous because the one or more programs provide it in a short period of time and subsequently, learn if the attendance produced the anticipated positive result by continuing to monitor the tone of the meeting after an absent individual has joined.

Embodiments of the present invention are additionally inextricably tied to computing at least because these embodiments provide an enhancement to an electronic meeting platform in the form of a cognitive agent that determines the impacts of attendance deficits at a given event, contemporaneously with the event, at different points in the event, and throughout the event, based on determinations enabled by the interconnectivity of the electronic meeting platform to computing nodes over a distributed system. The cognitive agent's analysis of needs and anticipation of event content is temporal and is accomplished, is embodiments of the present invention, with consistency, over time, and, in many cases, in real time. Embodiments of the present invention are additionally tied to computing because the one or more programs comprising the agent generate and update a data model and/or database, which enables the cognitive agent to perform the analysis of event content with increased accuracy with increased usage of the agent.

FIG. 1 is a technical environment 100 into which aspects of some embodiments of the present invention may be implemented. As will be discussed utilizing this environment 100 as a non-limiting example, in embodiments of the present invention, one or more programs perform a cognitive analysis to determine whether an attendee who is absent should join an in-progress meeting, at what point, and with what level of urgency. FIG. 1 illustrates how the interconnectivity and communication between various computing resources that arguably comprise different systems, and/or resources of a distributed computing system, enable this functionality. Specifically, in this example, the technical environment 100 includes one or more resources comprising an electronic calendaring system 110, messaging system 120, an electronic meeting platform, in this example a teleconferencing system 130, a user repository 150, and the one or more programs comprising a cognitive proxy system 140, which may be executed on resources with one or more processors.

In some embodiments of the present invention, the one or more programs of the cognitive proxy system 140 obtain data related to scheduled events from the electronic calendaring system 110 and the one or more programs determine whether a potential conflict exists for a given individual at a given time. For example, the one or more programs may determine that an invitee of a given event is not going to attend a given event, either based on the attendee having declined the event and/or the individual being committed to attend another that is contemporaneous with the event. Based on determining that an individual will be unable to attend an event, the one or more programs deploy of the cognitive proxy system 140 deploy an electronic proxy to attend the event.

The electronic proxy of the cognitive proxy system 140, which itself comprises one or more programs executed by one or more processors, virtually attends the event by connecting to the electronic platform that is hosting the event, i.e., the teleconferencing system 130. Depending on the technologies utilized by the hosting platform and the connectivity capabilities of the cognitive proxy system 140, the electronic proxy may employ one or more of a telephone (e.g., voice over IP) or web interface to join the event as a proxy for the absent individual. In some embodiments of the present invention, the teleconferencing system 130 may indicate, in a graphical user interface accessible to the attendees of the event, that one or more of the individual or a proxy for the individual, is attending the event. The teleconferencing system 130 configures the display in the GUI based on data supplied by the electronic proxy.

The electronic proxy of the cognitive meeting proxy system 140 monitors and records the event. The electronic proxy may record the event by maintaining a textual record and/or maintaining an electronic audio recording, for example, in a repository, such as one or more memory in the cognitive proxy system 140. While monitoring the event, the electronic proxy analyzes the content utilizing data in a user repository 150. One or more programs of cognitive proxy system 140 generated this user repository 150 and during meetings, the one or more programs both reference and update the data comprising the user repository 150 in a perpetual machine-learning process.

Figure 2:
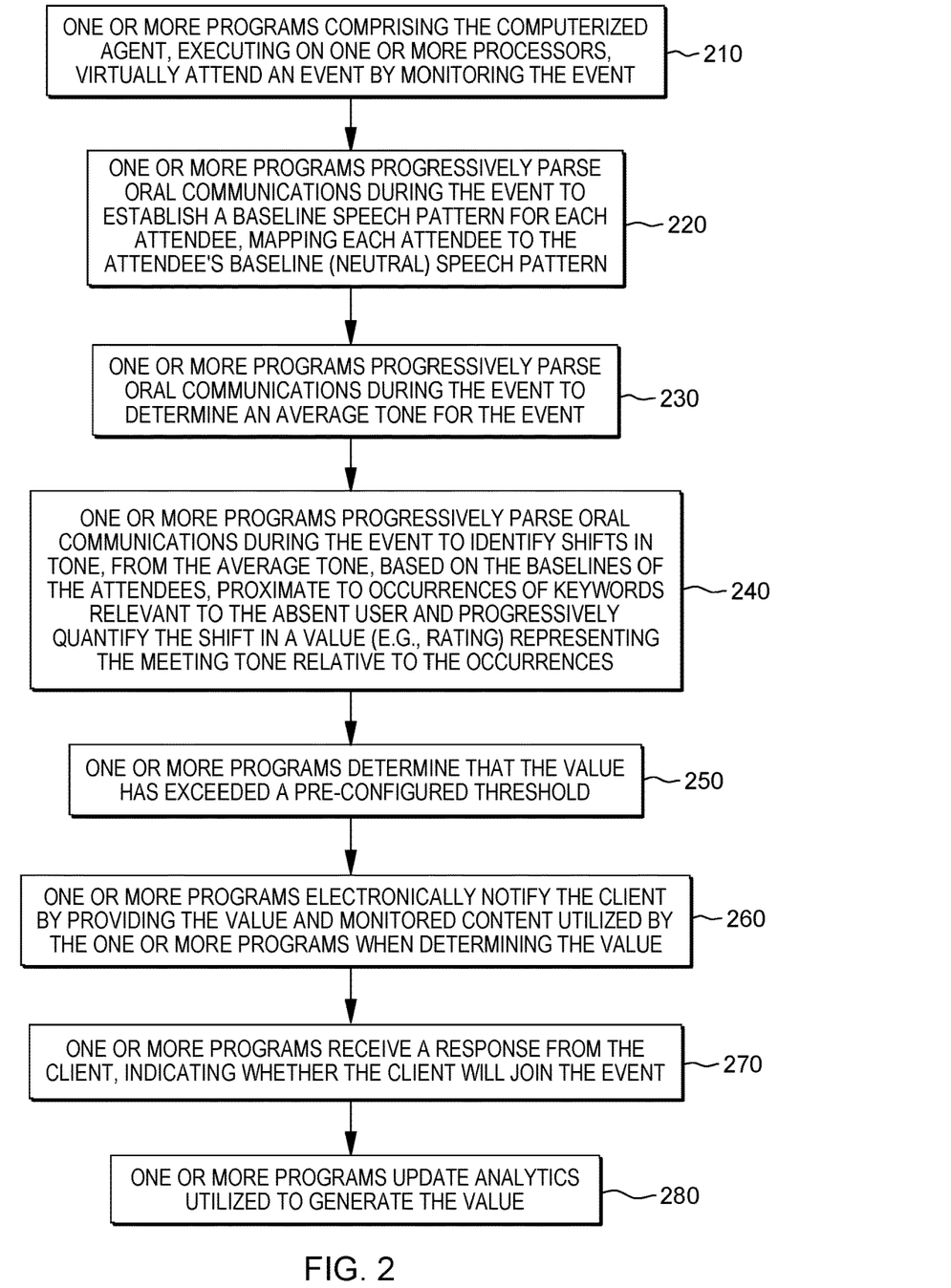
FIG. 2 is a workflow illustrating certain aspects of an embodiment of the present invention.

In some embodiments of the present invention, the one or more programs of the cognitive proxy system 140 generate and update data in the user repository 150 in order to establish and maintain speech patterns are established for all potential users, who may be utilizing the teleconferencing system 130. In some embodiments of the present invention, while monitoring a given event, a computerized agent of the cognitive proxy system 140 generates a mapping to the user repository 150 for each meeting attendee and the attendee's speech pattern to develop a baseline speech pattern for each attendee. For each meeting attendee, the one or more programs focus on the content of the speech and the tone in which the content is conveyed. The one or more programs may customize data related to certain users as well as building a composite user model that the one or more programs can apply to a guest user. During an event, the one or more programs of the cognitive proxy system 140 identify users in a given meeting, based on obtaining this data from the teleconferencing system 130. If the one or more programs cannot match a user profile in the user repository 150 to a participant in a meeting, the one or more programs may apply a composite user profile when analyzing the participation of the user in the event. To establish a baseline to utilize for tone analysis, the computerized agent may train the cognitive analytics in the user repository 150 to provide more accurate analyses of user participation in the event in future events. However, as demonstrated in FIG. 2, which will be discussed later, in a given workflow 200 (FIG. 2), the computerized agent may train elements of the cognitive proxy system 140 and determine that a user should join or be joined to a given meeting. Thus, a separate training run is not utilized in certain embodiments of the present invention as the cognitive agent can both learn and make determinations in the same workflow 200 (FIG. 2).

Returning to FIG. 1, the user repository 150 in some embodiments of the present invention is comprised of user profiles that include data to indicate sentiments associated with different tones in which each user (participant) may speak. The user repository 150 also includes data-based representations of a neutral tone or sentiment for each user, such that the one or more programs can recognize a deviation from this baseline. For example, in an embodiment of the present invention, the one or more programs may establish a baseline for each user, representing a neutral tone. Based on this baseline, the one or more programs monitoring the user's participation in an event (e.g., the electronic agent) may identify any deviations from the baseline, which would indicate a sentiment change, including but not limited to, a change in urgency and/or attitude.

In some embodiments of the present invention, the one or more programs may establish a baseline for each user during a given event that the electronic agent is monitoring and/or in advance of the event, based on a user's participation in earlier events, soliciting and accepting, e.g., via a messaging system 120, (audio) speech samples from a user, and/or collecting speech samples available publicly, including but not limited to, from social media accounts associated with the user. Using this baseline, the electronic agent can determine when a user's tone is no longer neutral. When possible, utilizing a user repository 150 with varied data regarding different users provides more accuracy than using a composite because the baselines and variation from a baseline varies across different speaker/users.

During an event, in which the computerized agent monitors the content (discussions, statements, utterances, topics, etc.), the computerized agent may utilize various existing technologies to process the content. For example, in embodiments of the present invention, the one or more programs that comprise the computerized agent may utilize speech recognition and natural language processing software to identify and track topics of discussion. If the event includes a visual component, e.g., visuals displayed in a web interface, the one or more programs of the computerized agent may also parse the data in the visuals to track topics discussed in the meeting.

The computerized agent determines whether to notify or join an absent user to an event hosted by the teleconferencing system 130, for example, by identifying, during the event, references to the absent user, within a given proximity to a tone change of at least one participant in the event. References to the user identified by the computerized agent may include, but are not limited to, keywords, including names, callouts, specific phrases, that are relevant to the user. The connections between the various keywords and a given user may be maintained by the one or more programs in the user repository 150. In some embodiments of the present invention, the computerized agent monitors the event for occurrences (verbal and written) of the user's name or role, obtains statements made in close proximity (e.g., within a given timed proximity) to each occurrence, and determines, based on the data in user repository 150, the tone of the statements. In some embodiments of the present invention, the computerized agent may determine an overall tone for the event and based on the tone reflecting a certain sentiment and/or urgency, may alert the user to join the event or automatically join the user to the event on the teleconferencing system 130. In some embodiments of the present invention, the one or more programs of the computerized agent may determine an overall tone in order to determine when the statements made in close proximity to each occurrence deviate from the tone. The one or more programs record these deviations in tone for playback or transcribe the audio into a text file, for recall and/or transmission to the user.

Based on identifying deviations from the tone of an event within a proximity to mentioned of the user, the one or more programs calculate a quantitative or assign a qualitative value to represent a perceived advantage to having the absent user join the event. The value may capture general tone deviations but the computerized agent will weight deviations within a proximity to mentions of the user more heavily in generating the value. The one or more programs of the computerized agent adjust the rating as the event progresses. When the value exceeds a given acceptability threshold, the computerized agent: 1) alerts the user that the user should join the event, utilizing, for example, the messaging system 120, and/or 2) automatically joins the user to the event. In embodiments of the present invention where the computerized agent provides a notification, the notification may include a link to or the files comprising the recorded content of the meeting that influenced the rating.

In some embodiments of the present invention, the messaging system 120 is an instant messaging system, which the computerized agent utilizes to notify the absent user that the user should join an event, providing the user with a value (or rating) to represent a perceived advantage of the user joining the event. Via the messaging system 120, the cognitive agent may receive a response from the user, via a computing resource utilized by the user. For example, the computerized agent may receive a message, via the messaging system 120, that the user will be joining the call within a specified timeframe. The computerized agent may alert the participants of the call, by communicating with the teleconferencing system 130 resource. Alternative or additionally, the computerized agent may resume monitoring the call based on the provided timeframe.

The computerized agent may continue to monitor the event after the formerly absent user has joined. As before, the computerized agent monitors the tone of the participants, in relations to mentions of the user, applying the models/data in the user repository 150. The computerized agent quantifies and/or qualifies the tone of the event, optionally including relative to the tone that necessitated the initial value that exceeded a threshold for notifying the user. Based on the tone shift, if any, the computerized agent of the cognitive proxy system 140, updates the analytics in the user repository 150. Thus, the cognitive agent may validate the value upon which the notification of the user or the automatic joining of the user to the event was based. Based on the validation, for future events, the computerized agent can attribute more weight to the content from which the computerized agent determined that a tonal shift has occurred.

As discussed in reference to the technical environment 100, in embodiments of the present invention, one or more programs comprising a cognitive proxy system 140: 1) delegate a proxy, also referred to herein as a computerized agent, to an event based on determining, based on data from a calendaring system 110, that a user is unable to attend an event to which the user is invited; 2) monitor the event, via the delegated computerized agent, to identify keywords in oral and written content in the meeting, that are relevant to the absent user, including names, callouts, specific phrases, etc.; 3) determine a baseline user voice patterns (e.g., neutral conversational tone) for each participant in the event; 4) determine an event tone by performing sentiment and emotion analysis around conversations monitored at the event; 5) correlate the tone, the keywords, and analysis of participant tone utilizing the baselines to determine a value to represent a deviation from the overall tone in portions of the conversation proximate to mentions of the keywords; 6) based on the deviation reaching or exceeding a pre-determined threshold, taking an action to join the absent user (the proxy owner) to the event, including but not limited to, notifying the user and/or automatically joining the user to the event; and 7) subsequent to notifying the user (proxy owner), communicate proxy owner feedback to the rest of the participants. In some embodiments of the present invention, the notification may include both the score and the underlying data that produced the score, including recordings and/or transcripts generated and retained by the computerized agent that memorialize the portions of the event with tone deviations proximate to the keywords. The value may represent a confidence score related to a qualified and/or quantified perceived importance that the user attend the meeting to mitigate tonal issues. In order to continuously improve the functionality of the cognitive proxy system 140 and tune the user repository 150 data utilized to analyze the tones of the participants, including any deviations in tones, in embodiments of the present invention, one or more programs of the cognitive proxy system 140 also: 8) learn from the aforementioned proxy owner's feedback to the notifications (e.g., if the user does not join based on the notification, the one or more programs may readjust the weighting of the factors that led to this notification); and 9) monitor the event after the user joins to identify event tone changes and learn from the changes to inform future analyses.

Utilizing a computerized agent, which is a cognitive proxy, to attend an event in place of a user and to alert the user as to when the user's presence would be beneficial would mitigate potential issues in a number of common situations. Below are two scenarios in which the cognitive proxy system 140 is advantageous.

In a first example, technical subject matter expert may skip a customer service call, assuming that the call will not cover subjects relevant to the expert, but rather, will review, for example, business processes. Should this call progress unexpectedly into this expert's area of expertise, the computerized agent in embodiments of the presence invention can procure the presence of the expert at a relevant moment. For example, the customer representative may reference the expert, by name, with a critical tone, allowing the computerized agent to perceive the change in tone and procure the expert's attendance. In some embodiments of the present invention, the computerized agent would alert the expert to the negative tone of the call with a value and excerpts of the call that support the value. The expert can review the value and/or the excerpts to determine whether to join the call. Should the expert decide to attend the call, utilizing the computerized agent, the expert alerts the participants on the call that the expert will be joining the call within a given timeframe. Based on the expert's participation in the call, the computerized agent determines whether the tone shifts to a more positive tone, based on the attendance of the expert and update the cognitive analytics to enable future more accurate sentiment and tone analyses.

In a second example, a given individual is invited to two meetings that occur simultaneously. The user determines, based on her profession through her workload, which a first meeting of the meetings, a project status meeting, is less important for her to attend, and attends a second meeting. One or more programs of the cognitive meeting system 140 deploy a proxy (a computerized agent) to attend the first meeting. The computerized agent monitors the meeting and analyzes the tone when proximate to mentions of keyword related to the user and the tone, in general, and in portions of the meeting that are not proximate to the keywords. In this case, the tone is positive overall and positive when proximate to the keywords, but negative when unrelated subjects are discussed. Based on these results, the computerized agent neither notifies nor joins the user to the meeting, determining the value of her presence is below a threshold.

FIG. 2 is a workflow 200 that illustrates certain aspects of some embodiments of the present invention. In this workflow 200, one or more programs of the cognitive proxy system 140 (FIG. 1) train the analytics its one or more programs (i.e., computerized agent) will apply when monitoring an event hosted on an electronic platform (e.g., teleconference, web conference) and determining whether a threshold is met for alerting the proxy owner and/or automatically joining the proxy owner to the event. Workflow 200 also illustrates the machine learning of the one or more programs comprising the computerized agent of the cognitive proxy system 140 (FIG. 1) to build content in the user repository 150 (FIG. 1).

Turning to FIG. 2, in some embodiments of the present invention, one or more programs comprising the computerized agent virtually attend an event by monitoring the event (210). The computerized agent is a proxy for an absent user. In some embodiments of the present invention, the client of the absent user configures the computerized agent. In other embodiments of the present invention, one or more programs of the cognitive proxy system 140 (FIG. 1) automatically configure the computerized agent, based on determining an existence of an event hosted on an electronic platform that the client will not attend (e.g., due to a conflict, due to receiving a refusal of an invitation, etc.), despite an invite to the absent user and/or a requirement of the absent user's attendance as a parameter of the event.

As part of monitoring the event, the one or more programs progressively parse oral communications during the event (e.g., speech at the event) to establish a baseline speech pattern for each attendee, mapping each attendee to the attendee's baseline (neutral) speech pattern (220). Based on monitoring the content of speech at the event, the proxy identifies each attendee of the meeting and establishes a baseline speech pattern for each attendee, the baseline speech patterns representing a neutral tone for each attendee. The one or more programs effectively map each meeting attendee to a speech patterns. Throughout the monitoring, the one or more programs continuously update the baselines for each attendee.

Also as part of monitoring the event, the one or more programs progressively parse oral communications during the event to determine an average (or overall) tone for the event (230). In some embodiments of the present invention, the one or more programs perform sentiment and emotion analysis around ongoing conversation to determine a binary tone for a meeting (e.g., positive or negative). In some embodiments of the present invention, the tone is not a binary selection and can be assigned to values on a predetermined scale.

Also as part of monitoring the event, the one or more programs progressively parse oral communications during the event to identify shifts in tone, from the average tone, based on the baselines of the attendees, proximate to occurrences of keywords relevant to the absent user and progressively quantify the shift in a value (e.g., rating) representing the meeting tone relative to the occurrences (240). To appreciate the shift in value, the one or more programs may generate a correlation between event tone and the recitation of keywords (e.g., callouts), during the event. For example, the one or more programs may listen for keywords, including but not limited to, the name of the user, a callout relevant to the user, a specific phrase, etc. The value may comprise a deviation score/rating based on the baseline speech patterns of attendees, the overall meeting tone, and the prevalence of keywords proximate to tonal shifts (as determined based on the baselines of the attendees as well as the overall tone determination).

The one or more programs determine that the value has exceeded a preconfigured threshold (250). As the analysis is progressive, there may be a point in time in this event where the value exceeds the threshold, based on specific content that is contemporaneously with the shift.

The one or more programs electronically notify the client by providing the value and the monitored content utilized by the one or more programs when determining the value (260). Thus, the one or more programs provide the client with both a value, but also the evidentiary basis of the value. For example, the one or more programs may provide the client with recordings from the event that include portions of the conversations that embody tone shifts in proximity to mentions of keywords. In some embodiments of the present invention, the one or more programs may provide the client with text that is a transcript of the portions of the conversation that embody the tone shifts that led to the value exceeding the threshold.

The one or more programs receive a response from the client, indicating whether the client will join the event (270). Based on this response, the one or more programs update analytics utilized to generate the value (280). In some embodiments of the present invention, the one or more programs may automatically join the client to the event, based on the value exceeding a given threshold.

Figure 3:
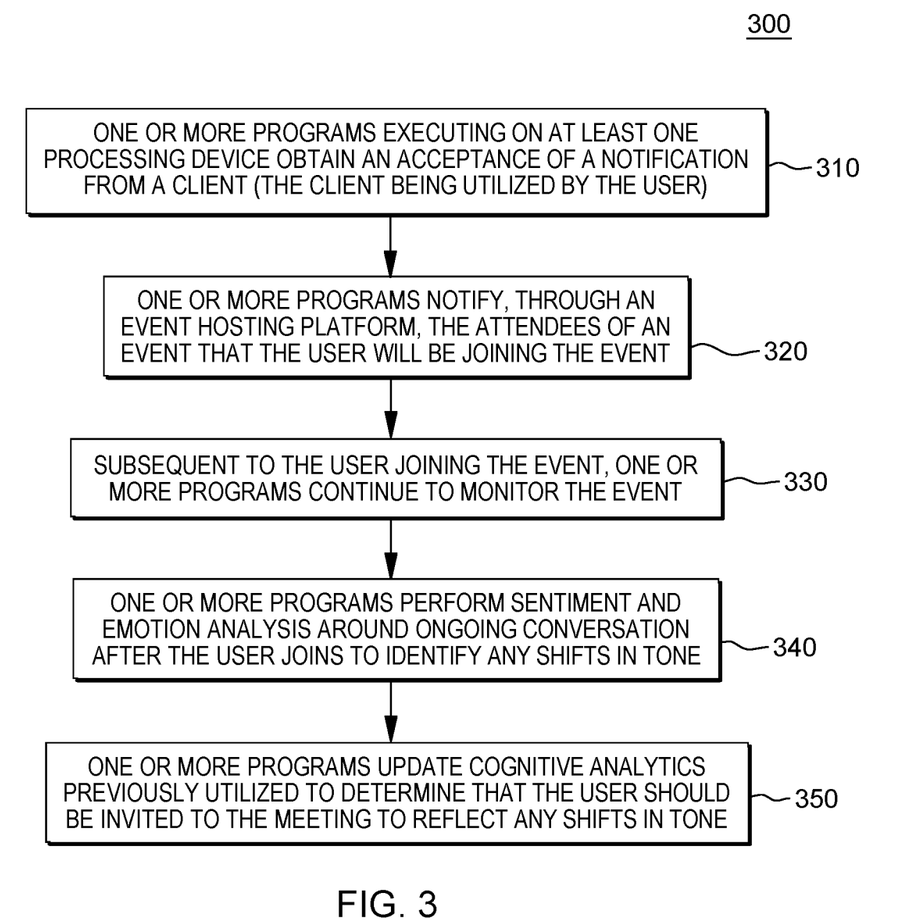
FIG. 3 is a workflow illustrating certain aspects of an embodiment of the present invention.

FIG. 3 is a workflow 300 that illustrates certain aspects of some embodiments of the present invention when the one or more programs notify a user to join an event and based on the evidence provided in this notification, the user opts to join the event. The one or more programs obtain an acceptance of the notification from the user (via a client being utilized by the user, over a network) (310). The one or more programs notify, through the event hosting platform, the attendees of the event that the user will be joining the event (320). Subsequent to the user joining the event, the one or more programs continue to monitor the event (330). The one or more programs perform sentiment and emotion analysis around ongoing conversation after the user joins to identify any shifts in tone (340). The one or more programs update the cognitive analytics utilized to determine that the user should be invited to the meeting to reflect any shifts in tone (350). For example, if the a negative tone shifts to a more positive tone, the one or more programs would confirm its conclusions and if the tone remains the same or does not improve, the one or more programs could update the analytics to indicate that the addition of the user was ineffective.

Embodiments of the present invention include a computer-implemented method, a computer program product, and a computer system where one or more programs, executing one or more processors, obtain an instruction to connect to attend an event, via a network, from one or more resources executing an electronic hosting platform, based on determining that an invitee is unavailable at a start time of the event hosted on the electronic hosting platform. The one or more programs monitor the event, based on the instruction, to assign or periodically update a value for the event, the event including verbal content provided by one or more attendees of the event, and the value comprises a temporally shifting value during the event, where the attendees provide the verbal content via one or more client computing devices communicatively coupled to the electronic hosting platform during a duration of the event. The monitoring includes: the one or more programs analyzing sentiment and emotion in the verbal content, the one or more programs generating, based on analyzing the sentiment and the emotion in the verbal content, a speech baseline for each of the one or more attendees, wherein the speech baseline for each of the one or more attendees comprises a tone neutral vocal communication pattern for each of the one or more attendees, the one or more programs determining, based on analyzing sentiment and emotion in the verbal content, an aggregate tone for characterizing the event, and the one or more programs generating and progressively updating during the monitoring, the value, wherein the value represents deviations in tone from the aggregate tone in portions of the verbal content proximate to an occurrence of one or more keywords relevant to the invitee, based on the aggregate tone and the speech baseline for each of the one or more attendees. The one or more programs determine that the value has exceeded a preconfigured threshold. The one or more programs trigger, based on the value having exceeded the preconfigured threshold, an action to facilitate connection of the invitee to the event. In some embodiments of the present invention, the one or more programs trigger the action by transmitting a notification the invitee comprising the value. In some embodiments of the present invention, the one or more programs trigger the action by automatically joining the invitee to the event.

In some embodiments of the present invention, as part of the monitoring, the one or more programs record select portions of the verbal content wherein the select portions comprise the deviations in tone from the aggregate tone in the portions of the verbal content proximate to the occurrence of the one or more keywords relevant to the invitee, based on the aggregate tone and the speech baseline for each of the one or more attendees. The notification may include the select portions. The select portions may be one or more of: one or more text transcripts and one or more audio recordings.

In some embodiments of the present invention, the one or more programs obtain an indication from the invitee, via a client, that the invitee will not join the event. The one or more programs update analytics utilized in the analyzing of the sentiment and the emotion in the verbal content to assign less weight to future verbal content similar to the select portions.

In some embodiments of the present invention, the one or more programs obtain an indication from the invitee, via a client, that the invitee will join the event. The one or more programs notify the attendees of the event that the invitee will be joining the event.

In some embodiments of the present invention, the one or more programs determine that the invitee has joined the event. The one or more programs resume the monitoring to update the value for the event. The one or more programs retain, based on the monitoring, changes in the value subsequent to the determining. The one or more programs update analytics utilized in the analyzing of the sentiment and the emotion in the verbal content and one or more of the speech baselines, based on the changes.

In some embodiments of the present invention, when the one or more programs perform the monitoring, the one or more programs intermittently update, during the event, the speech baseline for each of the one or more attendees.

In some embodiments of the present invention, the one or more programs obtain the instruction by communicating with one or more resources of a calendaring system. The one or more programs then obtain from the calendaring system, data indicating that the invitee will not attend the event.

In some embodiments of the present invention, the instruction includes a configuration for a computerized agent and the computerized agent is configured and executed by the one or more processors (executing the one or more programs) to monitor the event.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, resources comprising the cognitive proxy system 140 (FIG. 1) can each be understood as a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
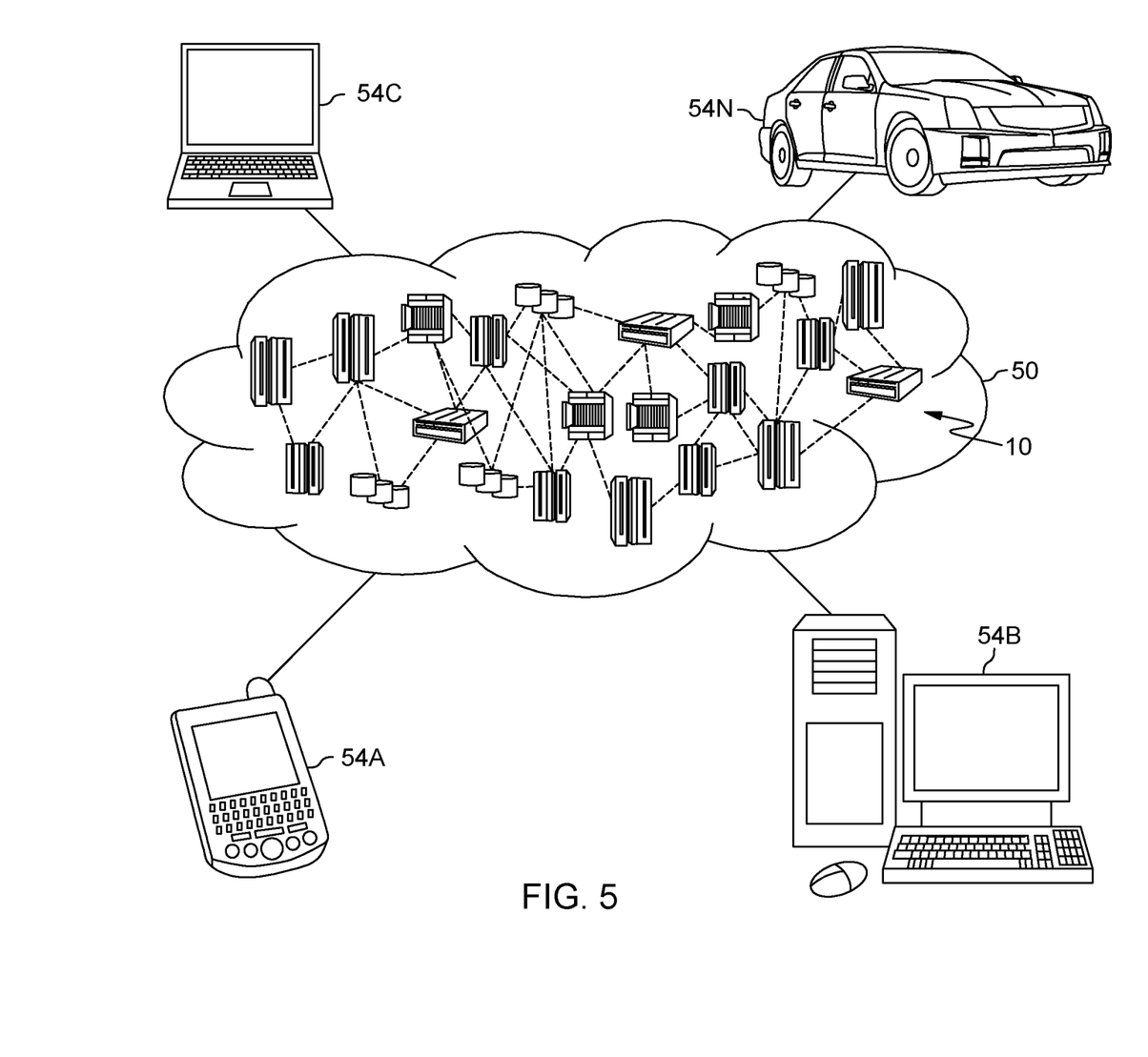
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
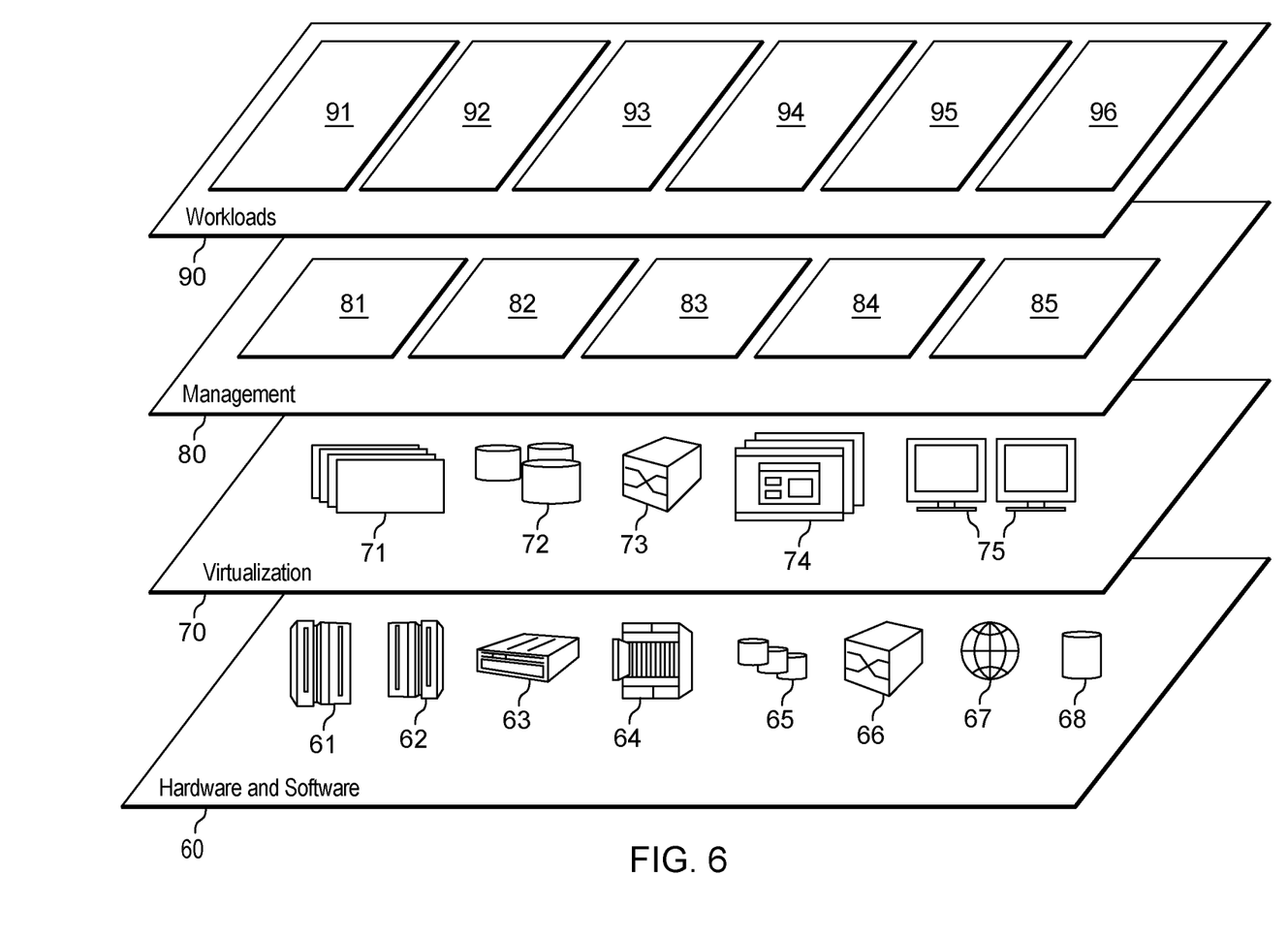
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing a cognitive multiple factor analysis to generate a notification or automatically join a user to an event on an event hosting platform 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, an instruction to connect to attend an event, via a network, from one or more resources executing an electronic hosting platform, based on determining that an invitee is unavailable at a start time of the event hosted on the electronic hosting platform;
   monitoring, by the one or more processors, the event, based on the instructions, the event including verbal content provided by one or more attendees of the event, wherein the attendees provide the verbal content via one or more client computing devices communicatively coupled to the electronic hosting platform during a duration of the event, the monitoring comprising:
      continuously analyzing, by the one or more processors, sentiment and emotion in the verbal content;
      generating, by the one or more processors, based on analyzing the sentiment and the emotion in the verbal content, a speech baseline for each of the one or more attendees providing the verbal content, wherein the speech baseline for each of the one or more attendees comprises a communication pattern for each of the one or more attendees;
      continuously monitoring, by the one or more processors, the verbal content utilizing the communication pattern for each of the one or more attendees to determine if a portion of the verbal content of a given attendee of the one or more attendees represents a deviation from the communication pattern of the given attendee, wherein the deviation is temporally proximate by a pre-defined amount to time to the verbal content comprising pre-established keywords relevant to the invitee, wherein the pre-established keywords are maintained by the one or more processors in a user repository; and
      based on determining that the portion of the verbal content represented the deviation, recording, by the one or more processors, the portion of the verbal content;
   determining, by the one or more processors, that the portion of the verbal content of the given attendee of the one or more attendees represents the deviation
   triggering, by the one or more processors, based on the deviation, an action to facilitate connection of the invitee to the event;
   obtaining, by the one or more processors, an indication from the invitee, via a client, selected from the group consisting of: an indication that the invitee will not join the event and an indication that the invitee will join the event;
   based on obtaining the indication that the invitee will not join the event, updating, by the one or more processors, analytics utilized in the analyzing of the sentiment and the emotion in the verbal content to assign less weight to future verbal content similar to the portion of the verbal content; and
   based on obtaining the indication that the invitee will join the event, resuming the analyzing, by the one or more processors, sentiment and emotion in the verbal content, and updating, by the one or more processors, analytics utilized in the analyzing of the sentiment and the emotion in the verbal content and one or more of the speech baselines, based on the resumed analyzing.

2. The computer-implemented method of claim 1, wherein the notification further comprises the portion of the verbal content.

3. The computer-implemented method of claim 2, wherein the portion of the verbal content is selected from the group consisting of: one or more text transcripts and one or more audio recordings.

4. The computer-implemented method of claim 1, further comprising:
   based on obtaining the indication that the invitee will join the event,
   notifying, by the one or more processors, the attendees of the event that the invitee will be joining the event.

5. The computer-implemented method of claim 1, wherein the monitoring further comprises:
   intermittently updating, during the event, the speech baseline for each of the one or more attendees.

6. The computer-implemented method of claim 1, wherein obtaining the instruction further comprises:
   communicating, by the one or more processors, with one or more resources of a calendaring system; and
   obtaining, by the one or more processors, from the calendaring system, data indicating that the invitee will not attend the event.

7. The computer-implemented method of claim 1, wherein the instruction comprises a configuration for a computerized agent, and wherein the computerized agent is configured and executed by the one or more processors to monitor the event.

8. A computer program product comprising:
   a computer readable storage medium readable by one or more processors and storing instructions for execution by the one or more processors for performing a method comprising:
      obtaining, by the one or more processors, an instruction to connect to attend an event, via a network, from one or more resources executing an electronic hosting platform, based on determining that an invitee is unavailable at a start time of the event hosted on the electronic hosting platform;
      monitoring, by the one or more processors, the event, based on the instructions, the event including verbal content provided by one or more attendees of the event, wherein the attendees provide the verbal content via one or more client computing devices communicatively coupled to the electronic hosting platform during a duration of the event, the monitoring comprising:
         continuously analyzing, by the one or more processors, sentiment and emotion in the verbal content;
         generating, by the one or more processors, based on analyzing the sentiment and the emotion in the verbal content, a speech baseline for each of the one or more attendees providing the verbal content, wherein the speech baseline for each of the one or more attendees comprises a communication pattern for each of the one or more attendees;
         continuously monitoring, by the one or more processors, the verbal content utilizing the communication pattern for each of the one or more attendees to determine if a portion of the verbal content of a given attendee of the one or more attendees represents a deviation from the communication pattern of the given attendee, wherein the deviation is temporally proximate by a pre-defined amount to time to the verbal content comprising pre-established keywords relevant to the invitee, wherein the pre-established keywords are maintained by the one or more processors in a user repository; and based on determining that the portion of the verbal content represented the deviation, recording, by the one or more processors, the portion of the verbal content;
determining, by the one or more processors, that the portion of the verbal content of the given attendee of the one or more attendees represents the deviation;
triggering, by the one or more processors, based on the deviation, an action to facilitate connection of the invitee to the event;
obtaining, by the one or more processors, an indication from the invitee, via a client, selected from the group consisting of: an indication that the invitee will not join the event and an indication that the invitee will join the event;
based on obtaining the indication that the invitee will not join the event, updating, by the one or more processors, analytics utilized in the analyzing of the sentiment and the emotion in the verbal content to assign less weight to future verbal content similar to the portion of the verbal content; and
based on obtaining the indication that the invitee will join the event, resuming the analyzing, by the one or more processors, sentiment and emotion in the verbal content, and updating, by the one or more processors, analytics utilized in the analyzing of the sentiment and the emotion in the verbal content and one or more of the speech baselines, based on the resumed analyzing.

9. The computer program product of claim 8, the monitoring further comprising:
recording, by the one or more processors, the portion of the verbal content.

10. The computer program product of claim 9, wherein the notification further comprises the portion of the verbal content.

11. The computer program product of claim 10, wherein the portion of the verbal content is selected from the group consisting of: one or more text transcripts and one or more audio recordings.

12. A system comprising:
a memory;
one or more processors in communication with the memory;
program instructions executable by the one or more processors via the memory to perform a method, the method comprising:
obtaining, by the one or more processors, an instruction to connect to attend an event, via a network, from one or more resources executing an electronic hosting platform, based on determining that an invitee is unavailable at a start time of the event hosted on the electronic hosting platform;
monitoring, by the one or more processors, the event, based on the instruction, the event including verbal content provided by one or more attendees of the event, wherein the attendees provide the verbal content via one or more client computing devices communicatively coupled to the electronic hosting platform during a duration of the event, the monitoring comprising:
continuously analyzing, by the one or more processors, sentiment and emotion in the verbal content;
generating, by the one or more processors, based on analyzing the sentiment and the emotion in the verbal content, a speech baseline for each of the one or more attendees providing the verbal content, wherein the speech baseline for each of the one or more attendees comprises a communication pattern for each of the one or more attendees;
continuously monitoring, by the one or more processors, the verbal content utilizing the communication pattern for each of the one or more attendees to determine if a portion of the verbal content of a given attendee of the one or more attendees represents a deviation from the communication pattern of the given attendee, wherein the deviation is temporally proximate by a pre-defined amount to time to the verbal content comprising pre-established keywords relevant to the invitee, wherein the pre-established keywords are maintained by the one or more processors in a user repository; and
based on determining that the portion of the verbal content represented the deviation, recording, by the one or more processors, the portion of the verbal content;
determining, by the one or more processors, that the portion of the verbal content of the given attendee of the one or more attendees represents the deviation;
triggering, by the one or more processors, based on the deviation, an action to facilitate connection of the invitee to the event;
obtaining, by the one or more processors, an indication from the invitee, via a client, selected from the group consisting of: an indication that the invitee will not join the event and an indication that the invitee will join the event;
based on obtaining the indication that the invitee will not join the event, updating, by the one or more processors, analytics utilized in the analyzing of the sentiment and the emotion in the verbal content to assign less weight to future verbal content similar to the portion of the verbal content; and
based on obtaining the indication that the invitee will join the event, resuming the analyzing, by the one or more processors, sentiment and emotion in the verbal content, and updating, by the one or more processors, analytics utilized in the analyzing of the sentiment and the emotion in the verbal content and one or more of the speech baselines, based on the resumed analyzing.

* * * * *